Patented Sept. 28, 1954

2,690,457

UNITED STATES PATENT OFFICE 2,690,457

PROCESS FOR THE PRODUCTION OF UN-SATURATED CARBONYLIC COMPOUNDS

Johannes Thomas Hackmann, Amsterdam, Netherlands, assignor to Shell Development Company, San Francisco, Calif., a corporation of Delaware No Drawing. Application November 16, 1948, Serial No. 60,417

Claims priority, application Netherlands January 5, 1948

2 Claims. (Cl. 260—586)

This invention relates to the oxidation over a cuprous oxide catalyst of olefins containing at least three carbon atoms to vinyl-type carbonylic compounds, that is, to unsaturated aldehydes and ketones containing an olefinic linkage between two carbon atoms of aliphatic character, one of which is directly linked to the aldehyde or ketone carbonyl group, and in particular to improvements in the process for accomplishing such oxidation. The invention is of particular importance for the production of acrolein by oxidation of propylene.

The process of the invention is executed by contacting in the vapor phase and at an elevated temperature a gaseous mixture comprising an olefin containing at least three carbon atoms and molecular oxygen or a molecular oxygen-containing gas with a solid catalyst essentially comprising cuprous oxide, alone or supported on a solid supporting material, promoted by a small quantity of palladium, or compounds thereof, under conditions at which a substantial amount of the olefin is directly oxidized to an alpha, beta-olefinically unsaturated aldehyde or ketone containing the same number of carbon atoms per molecule as the olefin. It has been found that when there are employed such promoted cuprous oxide-containing catalysts, high yields of the unsaturated carbonylic compounds may be obtained at lower temperatures than is possible in the case of the same catalysts without promoters.

The invention is generally applicable to the conversion over cuprous oxide catalysts of olefins of three or more carbon atoms to vinyl-type aldehydes or ketones. By the term "olefin" as used herein and in the appended claims is meant the open-chain as well as cyclic olefins. Among the many olefinic compounds which may be oxidized to unsaturated aldehydes or ketones in accordance with the process of the invention, the following may be mentioned: propylene, butene-1, butene-2, isobutylene, pentene-1, pentene-2, 3-methyl-butene-1, 2-methyl-butene-2, hexene-1, hexene-2, 4-methyl-pentene-1, 3,3-dimethyl-butene-1, 4-methyl-pentene-2, octene-1, cyclopentene, cyclohexene, 3-methyl-cyclohexene, etc. The lower alkenes are particularly contemplated as initial materials, although higher alkenes may also be used as such. These compounds and their various homologs and analogs may be substituted in the nucleus and/or in the substituents in various degrees by straight-chain alicyclic or hetero-cyclic radicals. The process of the invention is applicable to individual olefins as well as to mixtures of olefins and also to mixtures of olefins with the corresponding or other saturated organic compounds. In addition to the olefins, there may be present other components, such as water vapor and the like, as diluents. Conversions effectible by the process of the invention include the conversion of propylene to acrolein, isobutylene to methacrolein, alpha- or beta-butylene to methyl vinyl ketone, pentene-1 or pentene-2 to ethyl vinyl ketone and/or pentene-3-one-2, 2-methyl-butene-2 to methyl isopropenyl ketone, cyclopentene to cyclopentenone-2, and the like. Straight-chain alpha-olefins of three or more carbon atoms, when oxidized according to the process of the invention tend to yield the same products as the corresponding beta-olefins. Thus, as stated above, alpha-butylene, as well as beta-butylene, yields methyl vinyl ketone and pentene-1, like pentene-2, yields ethyl vinyl ketone. This is thought to result from isomerization of the alpha-olefins to the beta-olefins under the reaction conditions.

The cuprous oxide-containing catalysts employed in the execution of the process of the invention may be cuprous oxide alone or cuprous oxide supported upon or carried by or mixed with a suitable carrier material, in either case the catalyst being promoted by palladium. The catalysts employed according to the process of the invention preferably are prepared by impregnating a suitable carrier material with a solution of a copper compound, such as copper nitrate, to which a small quantity of a soluble compound of palladium has been added, and thereafter treating the impregnated carrier to convert the copper compound to principally cuprous oxide. Impregnation of the carrier may also be carried out by treating the carrier material with a concentrated solution of cupric chloride or of an ammonium compound comprising copper, as copper ammonium nitrate, containing a soluble compound of the promoter element. The copper nitrate and the copper-ammonium compounds may be decomposed to cuprous oxide by first heating the dried impregnated carrier between about 250° C. and 400° C. in a slow stream of air and then reducing the cupric oxide thus formed to cuprous oxide with hydrogen or other suitable reducing agent. Substantially the same procedure is followed in the preparation of the catalyst from the chloride except that repeated oxidation and reduction may be necessary. Instead of impregnating the carrier with a solution containing both the copper compound and a soluble compound of palladium, the copper compound and the promoter may be deposited successively on the carrier material, as by first impregnating the carrier material with the solution of the copper compound, followed if desired by its conversion to cuprous oxide, and treating the catalyst mass containing the copper with a solution of a soluble compound of palladium. It is necessary that the copper compound be converted at least in substantial part to cuprous oxide, since cupric oxide is ineffectual when applied in lieu of cuprous oxide in the execution of the process, the desired unsaturated carbonylic compounds being producible only after it has been reduced either partly or entirely, to cuprous oxide.

Suitable supporting materials which may be employed are, for example, silica gel, alumina, Alundum, diatomaceous earth, silicon carbide porous aggregates, pumice, activated carbon and the like. The carrier material may be in the form of granules, lumps, particles, powder, fragments, pellets, rings, or other formed pieces, or in other forms of regular or irregular contour. The amount of cuprous oxide on the carrier material may vary from a fraction of a per cent to 20% or more of the total weight of the contact mass.

If desired, there may be employed as the promoter palladium in admixture with other metals of the platinum-palladium group, that is of the eighth group, 4th and 6th periods, of the periodic system of the elements, such as rhodium, platinum, and iridium, or with group VIII elements of the fourth series and compounds of such elements, for example cobalt. The palladium may also be employed in admixture with rare earth metals, such as lanthanum, cerium, praseodymium, neodymium, and ytterbium. Only small quantities of the promoters need be present in the catalysts employed in the process of the invention, amounts of the promoter corresponding to less than 15 mole per cent, based on the copper contained in the catalyst, generally being employed. Quantities of the promoter amounting to no more than approximately 3% based on the weight of the copper contained in the catalyst are effective in producing enhanced activity of the catalyst and in many cases quantities of 0.1–1% by weight of the copper suffice in bringing about an appreciable increase in the activity of the catalyst.

The process of the invention is executed according to a preferred mode by contacting vapors of the olefin mixed with oxygen or an oxygen-containing gas, such as air, with the promoted cuprous oxide-containing catalyst at an elevated temperature. Although considerable latitude is permissible, the reaction temperature desirably is maintained in the range of from about 150° C. to about 600° C., and preferably from about 200° C. to about 450° C., in any given case the optimum temperature depending upon the particular catalyst, the olefin being treated, the rate of throughput or contact time, and the ratio of the olefin to oxygen. In most cases, the best results are obtained in the temperature range between approximately 250° C. and 400° C., although with reduced contact times the higher temperatures, for example up to approximately 600° C., may be used. In any given case, lower temperatures may be employed when there is used a promoted catalyst as provided by the invention than when the catalyst contains no palladium, providing advantages in the nature of reduced side-reactions resulting from purely thermal causes and reduced depreciation of equipment. To avoid excessive oxidation with resultant formation of carbon dioxide and water, care should be taken to insure a proper control of the temperature. It is, accordingly, desirable to effect the oxidation with the olefin present in excess with respect to the oxygen required for the oxidation to the unsaturated carbonyl compound. The oxidation of the olefin also may be effected in the presence of steam or other diluent gas which also facilitates control of the temperature.

The process of the invention may be carried out preferably in a continuous manner with recycling of unreacted olefin and/or oxygen. The pressure may be the atmospheric pressure or above or below the atmospheric pressure, pressures near atmospheric or moderately above being preferable.

In general, any apparatus of the type suitable for carrying out oxidation reactions in vapor phase may be employed in the execution of the process. When operating with a fixed bed catalyst, as is preferred, the apparatus thus may comprise a catalyst-packed reaction tube or chamber provided with suitable temperature-regulating means, such as a surrounding fluid temperature-regulating bath, internally located heating and/or cooling elements, or the like. The reaction may be conducted in one or plurality of reaction zones containing the promoted catalyst. The unsaturated carbonyl product or products may be isolated from the gaseous effluent from the reaction zone by any appropriate means, such as by condensation, by washing with cold water or other solvent, etc.

The process of the invention may be illustrated by reference to the following example.

*Example*

The catalyst was prepared by impregnating silicon carbide porous aggregates with an aqueous solution of cupric nitrate containing a small quantity of palladium chloride, drying, and decomposing the copper compound, and subsequently reducing the impregnated support by exposure to hydrogen gas at 250° C. to 300° C. during approximately 30 minutes. The copper content of the catalyst amounted to 0.34% by weight in the form of cuprous oxide and the palladium content was 0.0068% of the weight of the carrier.

A mixture of three volumes of propylene and one volume of oxygen was passed at the rate of 16 liters per hour through a reaction tube having an inner diameter of two centimeters and filled over a length of approximately 75 centimeters with the promoted cuprous oxide catalyst prepared above, heated and maintained by means of an electric furnace at 300° C. The experiment was continued for two hours while acrolein contained in the reactor effluent was condensed with the aid of a water-cooled condenser, and collected. An analysis of the reaction products showed the yield of acrolein per pass to be approximately 8% of the theoretical quantity to be obtained from the oxygen used. By recycling the reaction mixture over the catalyst after removal of the acrolein product, this yield could be increased considerably.

When repeating the foregoing test with a cuprous oxide catalyst prepared in the manner described above but without inclusion of the palladium, under reaction conditions otherwise the same the temperature of the reactor had to be raised to 350° C. before a yield of approximately 6.5% of acrolein could be obtained. A decrease of the temperature to below 350° C. resulted in an appreciable reduction of the yield of acrolein per pass.

I claim as my invention.

1. In a process for the production of an unsaturated carbonylic compound of the group consisting of the alpha,beta-olefinically unsaturated aldehydes and the alpha,beta-olefinically unsaturated ketones by oxidation of an olefin containing at least three carbon atoms in the presence of cuprous oxide, the step which comprises passing a gaseous mixture comprising an olefin containing at least three carbon atoms and oxygen into contact at a temperature of from about 250° C. to 400° C. with a solid catalyst essentially comprising cuprous oxide promoted by palladium.

2. The process defined by claim 1 in which the olefin is propylene.

References Cited in the file of this patent

UNITED STATES PATENTS

| Number | Name | Date |
|---|---|---|
| 1,871,117 | Day | Aug. 9, 1932 |
| 2,020,671 | Dreyfus | Nov. 12, 1935 |
| 2,366,724 | Gardner | Jan. 9, 1945 |
| 2,383,711 | Clark et al. | Aug. 28, 1945 |
| 2,398,612 | Bergsteinsson et al. | Apr. 16, 1946 |
| 2,430,443 | Becker | Nov. 11, 1947 |
| 2,451,485 | Hearne et al. | Oct. 19, 1948 |

FOREIGN PATENTS

| Number | Country | Date |
|---|---|---|
| 290,613 | Great Britain | Nov. 5, 1929 |